(12) United States Patent
Schoeller et al.

(10) Patent No.: US 8,724,493 B2
(45) Date of Patent: May 13, 2014

(54) METHOD FOR LINK QUALITY ESTIMATION IN A WIRELESS NETWORK

(75) Inventors: Marcus Schoeller, Kronau (DE); Pierre Imai, Eppelheim (DE); Stefan Schmid, Heidelberg (DE)

(73) Assignee: NEC Europe Ltd., Heidelberg (DE)

( * ) Notice: Subject to any disclaimer, the term of this patent is extended or adjusted under 35 U.S.C. 154(b) by 161 days.

(21) Appl. No.: 13/140,867

(22) PCT Filed: Dec. 18, 2009

(86) PCT No.: PCT/EP2009/009118
§ 371 (c)(1),
(2), (4) Date: Sep. 6, 2011

(87) PCT Pub. No.: WO2010/069585
PCT Pub. Date: Jun. 24, 2010

(65) Prior Publication Data
US 2011/0310755 A1     Dec. 22, 2011

(51) Int. Cl.
*H04J 3/00*     (2006.01)
*H04W 4/00*     (2009.01)
*G06F 15/173*   (2006.01)

(52) U.S. Cl.
USPC ............ 370/252; 370/338; 370/345; 709/223

(58) Field of Classification Search
USPC .......................... 370/238–468; 455/343–522; 709/220–224
See application file for complete search history.

(56) References Cited

U.S. PATENT DOCUMENTS

| | | | |
|---|---|---|---|
| 6,725,263 B1 * | 4/2004 | Torres | 709/223 |
| 6,894,985 B2 * | 5/2005 | Billhartz | 370/252 |
| 7,295,844 B1 * | 11/2007 | Moon et al. | 455/445 |
| 7,412,241 B2 * | 8/2008 | Strutt | 455/445 |
| 7,436,810 B2 * | 10/2008 | Ma et al. | 370/338 |
| 7,590,389 B2 * | 9/2009 | Anderson | 455/67.7 |
| 7,940,716 B2 * | 5/2011 | Twitchell, Jr. | 370/328 |
| 8,325,624 B2 * | 12/2012 | Hammarwall et al. | 370/252 |
| 8,582,492 B2 * | 11/2013 | Wu et al. | 370/315 |
| 2004/0022223 A1 | 2/2004 | Billhartz | |
| 2004/0127163 A1 * | 7/2004 | Schramm et al. | 455/67.11 |
| 2007/0064611 A1 * | 3/2007 | He | 370/236.2 |
| 2008/0049710 A1 * | 2/2008 | Zeira et al. | 370/345 |
| 2008/0069068 A1 * | 3/2008 | Dean et al. | 370/342 |
| 2008/0159151 A1 * | 7/2008 | Datz et al. | 370/238 |
| 2009/0257361 A1 * | 10/2009 | Deshpande et al. | 370/252 |
| 2010/0091667 A1 * | 4/2010 | Kazmi et al. | 370/252 |

FOREIGN PATENT DOCUMENTS

WO     2008/041929 A2    4/2008

OTHER PUBLICATIONS

International Search Report, dated Apr. 7, 2010, from corresponding PCT application.

* cited by examiner

*Primary Examiner* — Man Phan
(74) *Attorney, Agent, or Firm* — Young & Thompson

(57) ABSTRACT

A method for link quality estimation in a wireless network, is characterized in that nodes of the wireless network perform the steps of sending packets to other nodes, monitoring all packets received from other nodes being located within their communication range, and calculating sent-received ratios with respect to other nodes and deriving thereof a link quality towards the respective nodes.

16 Claims, 2 Drawing Sheets

METHOD FOR LINK QUALITY ESTIMATION IN A WIRELESS NETWORK

Figure 1:
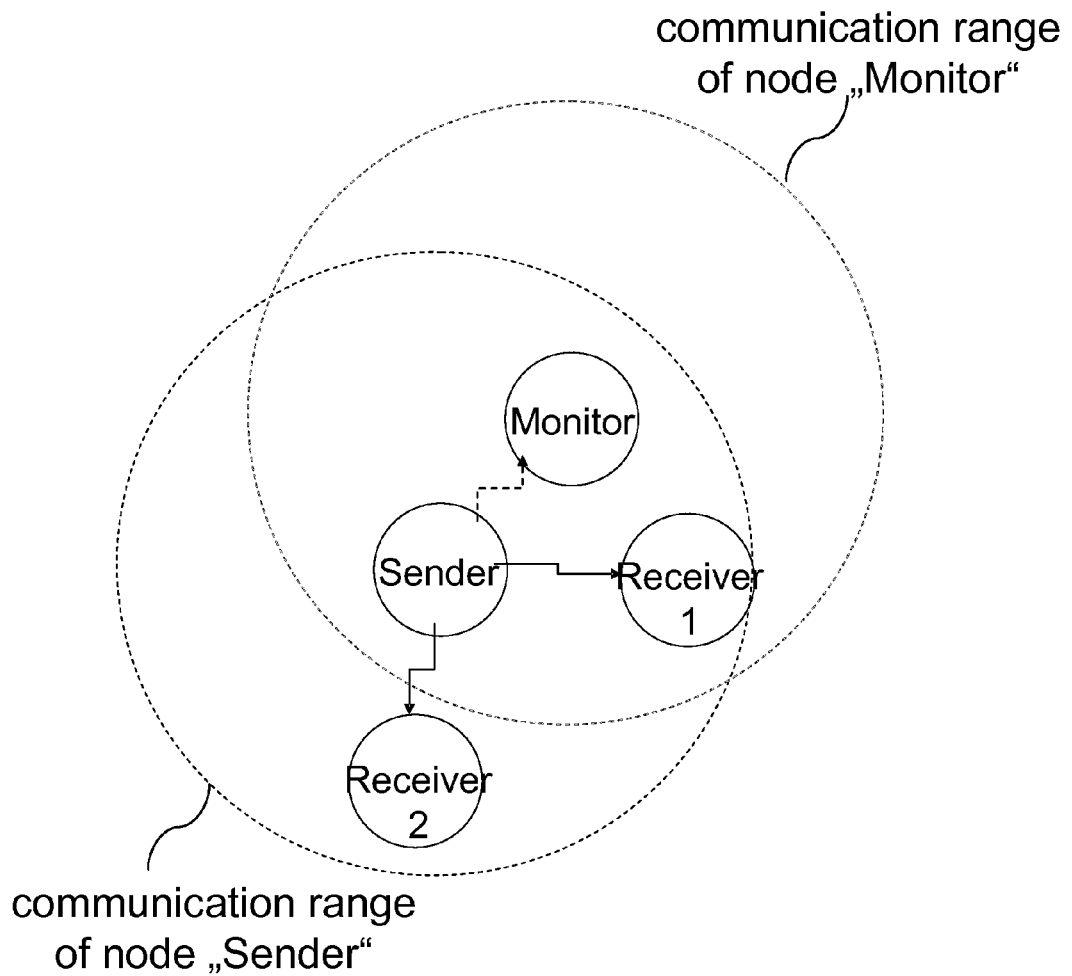

The present invention relates to a method for link quality estimation in a wireless network.

In recent years, the rapid increase of wireless radio communication, in particular by cellular telephony, has produced a steadily growing demand for effective and reliable link quality estimation. Exact knowledge of the actual channel conditions of wireless links is essential with respect to using the available bandwidth economically and, resulting thereof, to improve the overall performance of wireless networks. Furthermore, detailed knowledge of the link quality in wireless networks is essential for determining reliable end-to-end paths in routing protocols. Exact channel quality information enables routing protocols to make efficient routing decisions and to select routing paths that include only wireless links of sufficient quality.

Current systems for link quality estimation prosecute a mutual approach by measuring the channel conditions between two nodes that exchange data which each other. Typically, the signal strength, which is measured at the physical layer, is taken as indicator to derive the link quality. However, these approaches do not allow for determining the link quality between neighboring nodes that are not communicating with each other.

In K. Kyu-Han, S. Kang: "On Accurate Measurement of Link Quality in Multi-Hop Wireless Mesh Networks", *MobiCom '06*, Sep. 23-26, 2006, Los Angeles, Calif., USA, the authors propose a MAC layer based approach for link quality estimation. More specifically, the number of retransmission flags in MAC-layer frames is monitored to derive the link quality between the sender and a third-party node. However, the presented scheme only works if reliable MAC protocols are used.

It is therefore an object of the present invention to improve and further develop a method for link quality estimation in a wireless network in such a way that the accuracy and effectiveness of the link quality estimation are enhanced.

In accordance with the invention, the aforementioned object is accomplished by a method comprising the features of claim 1. According to this claim, such a method is characterized in that nodes of said wireless network perform the steps of sending packets to other nodes, monitoring all packets received from other nodes being located within their communication range, and calculating sent-received ratios with respect to other nodes and deriving thereof a link quality towards the respective nodes.

According to the invention it has been recognized that at the moment, link quality measurements are limited with respect to the type of data used as input for the measurement. Currently available solutions either ignore data that is not bound for the node that carries out the measurement, or use only a subset of the available information. However, as wireless networks are broadcast-based, all nodes within communication range receive all packets and therefore can process them, whether they are the intended recipient or not. The present invention takes advantage of this fact and proposes that each node monitors all packets—including data, signaling and management packets—received from other nodes being located within its communication range. Based on this monitored information a node can calculate sent-received ratios with respect to other nodes and derive thereof a link quality towards the respective nodes. By using this additional and so far ignored information of third-party communication, the information space is enlarged and the accuracy and effectiveness of the link quality estimation can be significantly improved. Furthermore, in contrast to prior art systems, the link quality between neighboring nodes that are not communicating with each other can also be derived with high reliability.

The present invention provides a simple mechanism to estimate link quality in wireless networks based on common wireless layer-2 functionality. The simplicity of the solution results from the fact that only packet counters are required for calculation of the link quality, and that no deep-packet inspection is necessary.

The method according to the invention only uses already available information, i.e. it does not require extensions of the MAC or active probing. The small resource footprint of the solution enables deployment on small devices with limited resources.

It is to be noted that for the sake of simplicity hereinafter only the term "packet" is employed, which is a common notation in e.g. 3G networks. However, in this regard it is not intended to limit the scope of the present invention in any way. A skilled person will easily recognize that the method according to the present invention applies in the same way also for "frames", which is just another notation typically being applied in connection with e.g. WLANs (Wireless Local Area Networks).

According to a preferred embodiment it may be provided that sending nodes define monitoring intervals for their outgoing packets and instruct other nodes that are located within their communication range accordingly. By synchronizing the monitoring intervals in such a way the nodes are enabled to monitor the same packets that have been sent or received, respectively, in exactly the same time period. It is to say that the monitoring intervals serve as time references for the calculation of sent-received values. Consequently, a malfunction in terms of comparing incorrectly counted numbers of packets, i.e., sent packets and received packets that do not match to each other with respect to the time period in which they were sent/received, is avoided.

In a concrete embodiment, the agreement on monitoring intervals is achieved by explicit signaling between a sending node and other nodes being located within its communication range. For instance, a synchronization between a sender and its neighboring nodes can be achieved by sending such an explicit indication or trigger by piggy-backing it on a sent packet.

Alternatively, it may be provided that new monitoring intervals are started with each request for connection establishment. For instance, an explicit synchronization flag could be integrated as reference into a request message for e.g. a TCP (Transmission Control Protocol) session.

According to still another embodiment, monitoring intervals may be defined as fixed time quanta starting at a predefined point in time. Such implementation would require tightly synchronized system clocks. However, many current devices have incorporated such system clocks, for instance mobile phones equipped with positioning means like e.g. GPS (Global Positioning System). These devices would even today support a time based negotiation of monitoring intervals.

Advantageously, nodes are configured to create individual receipt reports for other nodes—sending nodes—from which they receive packets. In particular, the receipt reports may include information about packets received from the respective sending nodes within the agreed monitoring interval.

In a specific embodiment the receipt reports include packet counters of packets received from a sending node per monitoring interval. Based on this information together with the knowledge of how many packets the sending node has sent in the monitoring interval, the sending node is enabled to derive respective sent-received ratios in order to determine link quality towards neighboring nodes.

The receipts reports may also be used as a reference signal for indicating the beginning of a monitoring interval. For instance, each time a node receives a receipt report from another node, this receipt may be taken as a trigger for starting a new monitoring interval.

With respect to a high reliability it may be provided that sent packets contain a packet reference, in particular a sequence number. In such cases receiving nodes are enabled to calculate a sent-received ratio on their own. This ratio can be included into the respective receipt report. Upon reception of the receipt report, the sending node does not have to perform any additional operations, but can extract the sent-received ratio (and thereby the link quality) directly from the receipt report.

With respect to insuring actuality it may be provided that receipt reports are periodically sent to the respective sending nodes. By this means, changes or disturbances of wireless channel conditions are promptly detected, thereby enabling the nodes to take suitable actions like, e.g., changing a routing path.

According to a preferred embodiment the nodes record information about their sent packets. In particular, the recorded information may include information items about the number of sent packets per monitoring interval. Additionally or alternatively, the recorded information may include information items concerning a packet reference, in particular packet sequence numbers. Based on this information, in both cases a node can easily derive the link quality towards another node when it receives a receipt report from that node.

In addition to the schemes described so far, knowledge of the communication protocol being used may be additionally employed for deriving the link quality. For instance, in voice communication a codec with, e.g., 64 kbit/s is specified. If data is monitored with a lower bit rate, this effect can be interpreted as a reduced signal quality. By calculating the ratio of the actually received bit rate and the initially negotiated one, a quantitative assessment of the link quality can be derived.

Once the link quality has been calculated, a stability value may be determined specifying how stable the link quality is. Generally, the stability value will depend on how reliable reference packets (indicating the beginning of the monitoring interval) and receipt reports can be transported via the wireless medium. In particular in cases in which a reliable transport is unfeasible, the stability calculation may gradually adapt the stability value. To this end the last received values may be considered. For instance, the stability value may be adapted based on the average of the last received values. A predefined number N of missing receipt reports, e.g. N=3, may be taken as indication that the connection was lost and may lead to a stability value 0.

There are several ways how to design and further develop the teaching of the present invention in an advantageous way. To this end, it is to be referred to the patent claims subordinate to independent patent claim 1 on the one hand, and to the following explanation of a preferred example of an embodiment of the invention illustrated by the drawing on the other hand. In connection with the explanation of the preferred example of an embodiment of the invention by the aid of the drawing, generally preferred embodiments and further developments of the teaching will be explained. In the drawings FIG. 1 schematically illustrates an application scenario of a method according to the present invention with nodes functioning as sending nodes, monitoring nodes and receiving nodes, and FIG. 2 schematically illustrates the characteristics of sending/receiving packets by the nodes of the embodiment illustrated in FIG. 1.

FIG. 1 illustrates a part of a wireless network of which four nodes are exemplarily depicted. One of the nodes functions as sender, another one functions as monitor, and the last two nodes function as receivers. It is to be understood, however, that this assignment of functionality is completely arbitrary and is made only for explanatory purposes. In practice, each node may function as sender, as receiver, and as monitor at the same time.

Referring now to the specific scenario illustrated in FIG. 1, the communication range of the sending node as well as the communication range of the monitoring node is illustrated in form of dotted line circles. As can be seen, all nodes are located within the communication range of the sending node, whereas only the sender and one receiving node are located within the communication range of the monitoring node. This means that the monitoring node receives all packets sent by the sending node, regardless of whether or not the intended recipient of the packet itself is located within the communication range of the monitor. According to the invention, all these packets, including the ones that are not addressed to the monitoring node, but that are passively monitored, are included into the calculation of sent-received ratios that form the basis for the link quality estimation. Furthermore, it is to be noted that every packet, i.e. not only packets carrying payload data, but also acknowledgement and control packets contribute to the link quality measurement of the respective link.

Figure 2:
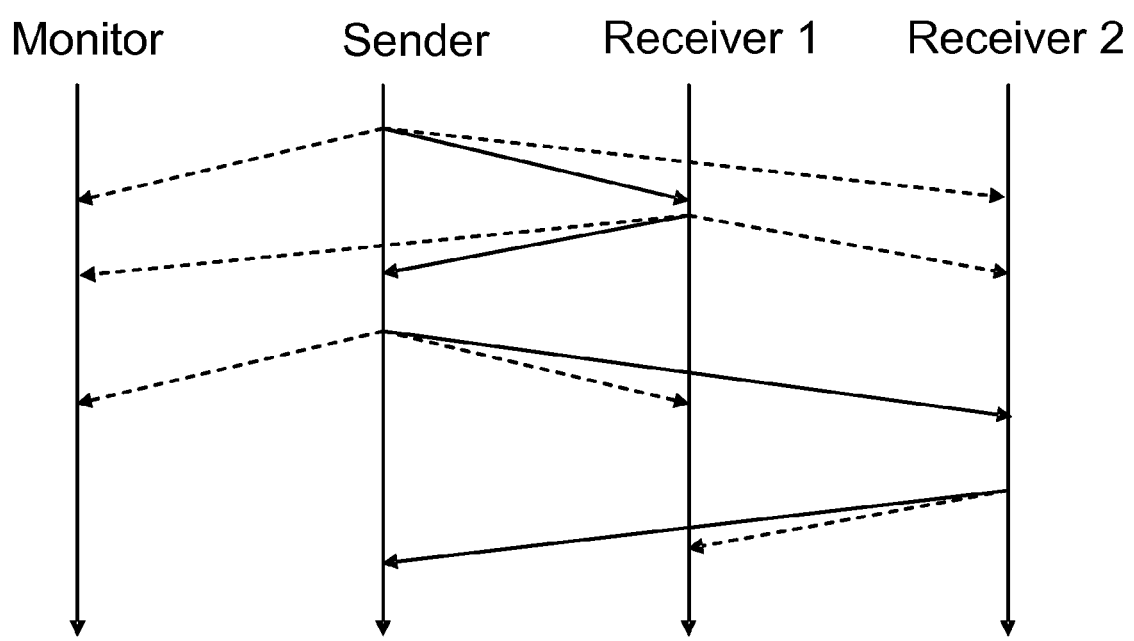

FIG. 2 illustrates the packet reception characteristic in the broadcast environment of FIG. 1 in more detail. As indicated by the upper solid line arrow the sender transmits a packet to receiver 1. However, the packet is not only received by receiver 1, but also by receiver 2 and the monitor (indicated by the dotted line arrows), since both nodes are also located within the sender's communication range. Receiver 2 and the monitor may perform a syntactic analysis of the packet to ensure that the packet was correctly received. Further, they will realize that the destination address of the packet does not match their own address, and they will silently discard the packet. For link quality estimation according to the present invention, however, it is only important that the packet was successfully received and can thus contribute to calculating sent-received ratios, independent of whether the receiving node is the intended recipient or not.

FIG. 2 illustrates three further scenarios, which are a packet sent from receiver 1 back to the sender, a packet sent from the sender to receiver 2, and a packet sent from receiver 2 back to the sender. Only the last packet, i.e. the one sent from receiver 2 to the sender, can not be passively monitored by the monitor, since receiver 2 is located outside the communication range of the monitor node.

To estimate link quality, according to a specific embodiment the following procedural steps may be performed:

1. Each node records relevant information of sent packets, e.g. the number of sent packets per monitoring interval, or some sort of packet reference (e.g. sequence number), and keeps a history of the most recent monitoring intervals.

2. Every remote node monitors all received information of neighboring nodes being located within its communication range. More specifically, the remote node monitors not only packets directed to it, but also packets directed to another node for which it "sees" the packets (passive monitoring).

3. Every node creates an individual "receipt report" for all nodes from which it receives packets. For example, this receipt report includes the packet counter of received packets per monitoring interval and a reference to the monitoring interval (monitoring interval length), or a packet reference (which indicates the beginning of a monitoring interval), or the loss ratio in case the receiver can derive this from packet/sequence counters.

4. All recipients of packets send their receipt report periodically to the sender in a dedicated message or piggy-packed to another message.

5. Based on the information contained in the receipt report together with its own knowledge about packets sent in previous monitoring intervals, the sender calculates the sent-received ratio and derives the link quality from that.

In the described example scalability is ensured, since only one packet receive counter per neighbor plus one packet sent counter for each monitoring interval in the history are required.

In order to achieve an efficient link quality estimation based on the monitoring of sent/received packets and the calculation of respective ratios, the following different variants can be implemented. For deployments in practice it is assumed that, as a prerequisite, the nodes are aware of which of the variants is actually implemented.

i. Sequence Number Based

In case the data packets contain some sort of sequence number or counters, from which a monitor can derive whether intermediate packets were lost, the receiver can start the monitoring at any time and periodically compute the sent-received ratio, which is then reported back to the sender.

ii. Interval Based on Explicit Trigger Form the Sender

The idea here is that the senders explicitly indicate to all neighboring nodes when their monitoring interval starts. Synchronization between sender and its neighbors can for example be achieved through sending such an indication by piggy-backing it on a sent packet or through the periodic receipt report of the sender (which at the same time acts as a receiver).

iii. Reference Based

In case no explicit triggers should be used and sequence numbers/counters are not available, a monitor could also use any other reference that can uniquely identify the first and last packet of the reporting period. For instance, an identifiable packet may be created by including an explicit synchronization flag. Upon reception of such an identifiable packet the monitor starts counting successfully received packets from that sender. In order to allow the sender to derive the sent-received ratio, this solution requires that the monitoring node indicates the start and end reference of the reporting period in the receipt report.

iv. Time Based

In case of tightly synchronized system clocks the monitoring interval can be defined as fixed time quanta starting at a pre-defined point in time. The monitor transmits the start time and counted packets in the receipt report.

v. Protocol Based

If the recipient has additional knowledge of the communication protocol, the link quality can be derived from the data itself. For instance, the data rate of RTP (Real-Time Transport Protocol) streams could be derived from received SDP (Session Description Protocol) messages and compared to the actual amount of data received.

In case of the second embodiment, synchronization between a sender and monitor is needed in order to calculate a meaningful sent-received ratio. The following method defines a particular mechanism how this synchronization can be achieved:

Self-Timing Interval Management

1. Each sender defines its own monitoring interval for outgoing packets.

2. A reporting/monitoring interval is started by sending an indication to all neighboring nodes, e.g. by piggy-backing it on sent packets or on the periodic receipt report.

3. The outgoing packet counter of the last interval is stored by the sender.

4. All receivers start a new monitoring interval for that sender by resetting the received packet counter—saving the packet counter of the last interval.

5. The receiver sends this saved packet-counter in its next update message including the length of the monitoring interval. The inclusion of the length of the monitoring interval enables the sender to crosscheck whether the length is consistent with its own monitoring interval, which would not be the case if a trigger message from the sender has been lost. In an alternative embodiment it could be provided that nodes are configured to send an acknowledgement in case of successfully receiving a receipt report. In such case the sender could omit the saving of a history of packet counters of past monitoring intervals.

6. If the interval length indicated by the receiver matches the timing at the sender the sender can calculate the sent-received ratio in order to derive the respective link quality. Otherwise the monitoring data of the last interval is discarded.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. Method for link quality estimation in a wireless network, comprising nodes of said wireless network performing the following:

sending packets to other nodes, monitoring all packets including data, signaling, and management packets received from other nodes located within a communication range, whether or not the nodes are the intended recipients, calculating sent-received ratios with respect to other nodes and deriving thereof a link quality towards the respective nodes, and defining monitoring intervals and instructing other nodes located within the communication range of the defined monitoring intervals, wherein nodes receiving packets create individual receipt reports for sending nodes, said receipt reports including information about packets received from a respective sending node within the defined monitoring interval, wherein sent packets contain a packet reference, in particular a sequence number, and wherein the receipt report includes a packet loss ratio derived by a respective receiving node.

2. The method according to claim 1, wherein said instruction is achieved by explicit signaling from node to other nodes located within the communication range.

3. The method according to claim 1, wherein new monitoring intervals are started with each request for connection establishment.

4. The method according to claim 1, wherein monitoring intervals are defined as fixed time quanta starting at a predefined point in time.

5. The method according to claim 1, wherein the receipt report includes a packet counter of packets sent from the respective node per monitoring interval.

6. The method according to claim 1, wherein the receipt report includes a packet reference indicating the beginning of monitoring intervals.

7. The method according to claim 1, further comprising periodically receiving receipt reports from a respective node.

8. The method according to claim 1, further comprising recording information about sent packets.

9. The method according to claim 8, wherein the recorded information about sent packets includes information items concerning the number of sent packets per monitoring interval.

10. The method according to claim 8, wherein the recorded information about sent packets includes the packet sequence numbers.

11. The method according to claim 1, comprising considering which communication protocol is being used to derive link quality.

12. The method according to claim 1, further comprising determining a stability value for the calculated link quality.

13. The method according to claim 12, wherein the stability value is gradually adapted based on last determined values.

14. The method according to claim 2, wherein new monitoring intervals are started with each request for connection establishment.

15. The method according to claim 5, wherein the receipt report includes a packet reference indicating the beginning of said monitoring intervals.

16. The method according to claim 9, wherein the recorded information about sent packets includes the packet sequence numbers.

* * * * *

UNITED STATES PATENT AND TRADEMARK OFFICE
CERTIFICATE OF CORRECTION

PATENT NO.       : 8,724,493 B2  
APPLICATION NO. : 13/140867  
DATED            : May 13, 2014  
INVENTOR(S)      : Schoeller et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 241 days.

Signed and Sealed this

Twenty-ninth Day of September, 2015

Michelle K. Lee
*Director of the United States Patent and Trademark Office*